US011194881B2

(12) United States Patent
Lee et al.

(10) Patent No.: US 11,194,881 B2
(45) Date of Patent: Dec. 7, 2021

(54) ELECTRONIC DEVICE AND METHOD FOR DISPLAYING WEB CONTENT IN AUGMENTED REALITY MODE

(71) Applicant: Samsung Electronics Co., Ltd., Gyeonggi-do (KR)

(72) Inventors: Jungjik Lee, Gyeonggi-do (KR); Younghwan Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/710,345

(22) Filed: Dec. 11, 2019

(65) Prior Publication Data
US 2020/0192963 A1    Jun. 18, 2020

(30) Foreign Application Priority Data
Dec. 13, 2018    (KR) .................. 10-2018-0160634

(51) Int. Cl.
*G06F 16/955* (2019.01)
*G06F 16/432* (2019.01)
(Continued)

(52) U.S. Cl.
CPC ........ *G06F 16/9566* (2019.01); *G06F 16/434* (2019.01); *G06F 16/487* (2019.01);
(Continued)

(58) Field of Classification Search
CPC ............... G06T 19/006; G06F 16/9554; G06F 16/9566; G06F 16/434; G06F 16/487;
(Continued)

(56) References Cited

U.S. PATENT DOCUMENTS

| 8,180,396 B2 | 5/2012 | Athsani et al. |
| 8,275,414 B1 | 9/2012 | Athsani et al. |
| (Continued) |

FOREIGN PATENT DOCUMENTS

| JP | 2013-539088 A | 10/2013 |
| JP | 2015204035 A * | 11/2015 |
| (Continued) |

OTHER PUBLICATIONS

Etienne, Jerome, "AR-Code:a Fast Path to Augmented Reality", Apr. 4, 2017, https://medium.com/arjs/ar-code-a-fast-path-to-augmented-reality-60e51be3cbdf. (Year: 2017).*

(Continued)

*Primary Examiner* — Gregory G Todd
(74) *Attorney, Agent, or Firm* — Cha & Reiter, LLC

(57) ABSTRACT

An electronic device is disclosed comprising a camera, a display, a wireless communication circuit, at least one processor operatively connected to the display, the camera and the wireless communication circuit, and a memory operatively connected to the at least one processor and storing instructions that, when executed, cause the at least one processor to: obtain a first image through the camera; extract a marker included in the first image; obtain a universal resource locator (URL) using the extracted marker; receive content of a web page associated with the URL through the wireless communication circuit, display the first image and at least a portion of the received content at a position on the first image determined based on a location of the marker on the display.

14 Claims, 9 Drawing Sheets

(51) Int. Cl.
*G06F 16/487* (2019.01)
*G06K 9/00* (2006.01)
*G06F 16/957* (2019.01)
*G06F 3/01* (2006.01)
*G06T 7/73* (2017.01)
*G06T 19/00* (2011.01)

(52) U.S. Cl.
CPC ...... *G06F 16/9554* (2019.01); *G06F 16/9558* (2019.01); *G06F 16/9577* (2019.01); *G06K 9/00671* (2013.01); *G06F 3/011* (2013.01); *G06T 7/74* (2017.01); *G06T 19/006* (2013.01)

(58) Field of Classification Search
CPC ............ G06F 16/9577; G06F 16/9558; G06K 9/00671; G06K 19/06028
See application file for complete search history.

(56) References Cited

U.S. PATENT DOCUMENTS

| | | | |
|---|---|---|---|
| 8,434,674 B2 | 5/2013 | Mangione-Smith | |
| 8,606,317 B2 | 12/2013 | Ahmad Athsani et al. | |
| 9,100,697 B1 | 8/2015 | Lee | |
| 9,104,677 B2 | 8/2015 | Koo | |
| 10,169,921 B2 | 1/2019 | Jayaraj et al. | |
| 10,777,017 B1* | 9/2020 | Saiger | G06F 16/958 |
| 2009/0102859 A1 | 4/2009 | Athsani et al. | |
| 2011/0134108 A1* | 6/2011 | Hertenstein | G06T 19/006 345/419 |
| 2011/0182926 A1 | 7/2011 | La Monica et al. | |
| 2011/0186625 A1 | 8/2011 | Mangione-Smith | |
| 2012/0244907 A1 | 9/2012 | Athsani et al. | |
| 2013/0044132 A1 | 2/2013 | Athsani et al. | |
| 2013/0057585 A1 | 3/2013 | Ahmad Athsani et al. | |
| 2013/0221091 A1 | 8/2013 | Koo | |
| 2013/0278632 A1 | 10/2013 | Cho et al. | |
| 2013/0278777 A1* | 10/2013 | Sweet, III | G06F 16/9577 348/169 |
| 2013/0297407 A1* | 11/2013 | Hymel | G06Q 30/0267 705/14.43 |
| 2014/0289607 A1* | 9/2014 | Ko | G06F 40/14 715/234 |
| 2015/0331240 A1 | 11/2015 | Poulos et al. | |
| 2015/0348329 A1* | 12/2015 | Carre | G06F 16/9554 345/633 |
| 2018/0040166 A1 | 2/2018 | Jayaraj et al. | |
| 2018/0349842 A1* | 12/2018 | Han | G06F 21/6245 |
| 2020/0192963 A1* | 6/2020 | Lee | G06F 3/011 |

FOREIGN PATENT DOCUMENTS

| | | |
|---|---|---|
| KR | 10-1053456 B1 | 8/2011 |
| KR | 10-2013-0110443 A | 10/2013 |
| KR | 10-1561267 B1 | 10/2015 |

OTHER PUBLICATIONS

Srinivasa et al., Augmented Reality Adaptive Web Content, Jan. 1, 2016, 2016 13th IEEE Annual Consumer Communications & Networking Conference (CCNC), pp. 107-110. (Year: 2016).*
International Search Report dated Apr. 10, 2020.

* cited by examiner

ELECTRONIC DEVICE AND METHOD FOR DISPLAYING WEB CONTENT IN AUGMENTED REALITY MODE

CROSS-REFERENCE TO RELATED APPLICATION(S)

This application is based on and claims priority under 35 U.S.C. § 119 to Korean Patent Application No. 10-2018-0160634, filed on Dec. 13, 2018, in the Korean Intellectual Property Office, the disclosure of which is incorporated by reference herein its entirety.

BACKGROUND

1. Field

Embodiments disclosed herein relate to a technique for displaying web content in an Augmented Reality (AR) mode.

2. Description of Related Art

Various markers, such as Quick Response (QR) codes or barcodes, may be printed on a package of a product to provide web content associated with the product. An electronic device may recognize the marker through a camera. The electronic device may display the content using information obtained through the marker.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device may include a camera, a display, a wireless communication circuit, at least one processor operationally connected to the display, the camera and the wireless communication circuit, and a memory operationally connected to the at least one processor to store instructions that, when executed, cause the at least one processor to acquire a first image through the camera, extract a marker included in the first image, acquire a universal resource locator (URL) using the extracted marker or the second image, receive content of a web page associated with the URL through the wireless communication circuit, and display the first image and at least a portion of the received content at a position on the first image determined based on a location of the marker or the second image on the display.

In accordance with another aspect of the disclosure, a method of displaying content of a web page may include acquiring a first image through a camera, extracting a marker included and a second image of a specified type in the first image, acquiring an universal resource locator (URL) using the extracted marker or the extracted second image, receiving the content of the web page associated with the URL by a communication circuit, and displaying the first image and at least a portion of the received content at a position on the first image determined based on a position of the marker or the second image on a display.

In accordance with another aspect of the disclosure, a storage medium may store computer readable instructions. The instructions, when executed by an electronic device, may cause the electronic device to acquire a first image through a camera, extract a marker and a second image of a specified type included in the first image, acquire an universal resource locator (URL) using the extracted marker or the extracted second image, receive the content of the web page associated with the URL, and display the first image and at least a portion of the received content at a position on the first image determined based on a position of the marker or the second image.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the scope and spirit of the disclosure.

When a marker, such as a QR marker or bar code, is recognized using a camera included in the electronic device and the web content is displayed using a display, a user might not simultaneously see an object, included in the image from the camera, and the web content.

Aspects of the disclosure may address at least the above-mentioned problems and/or disadvantages and may provide at least the advantages described below. Accordingly, one aspect of the disclosure is to provide an electronic device capable of simultaneously providing web content associated with an object in an image to a user while displaying an image obtained from the camera.

Figure 1:
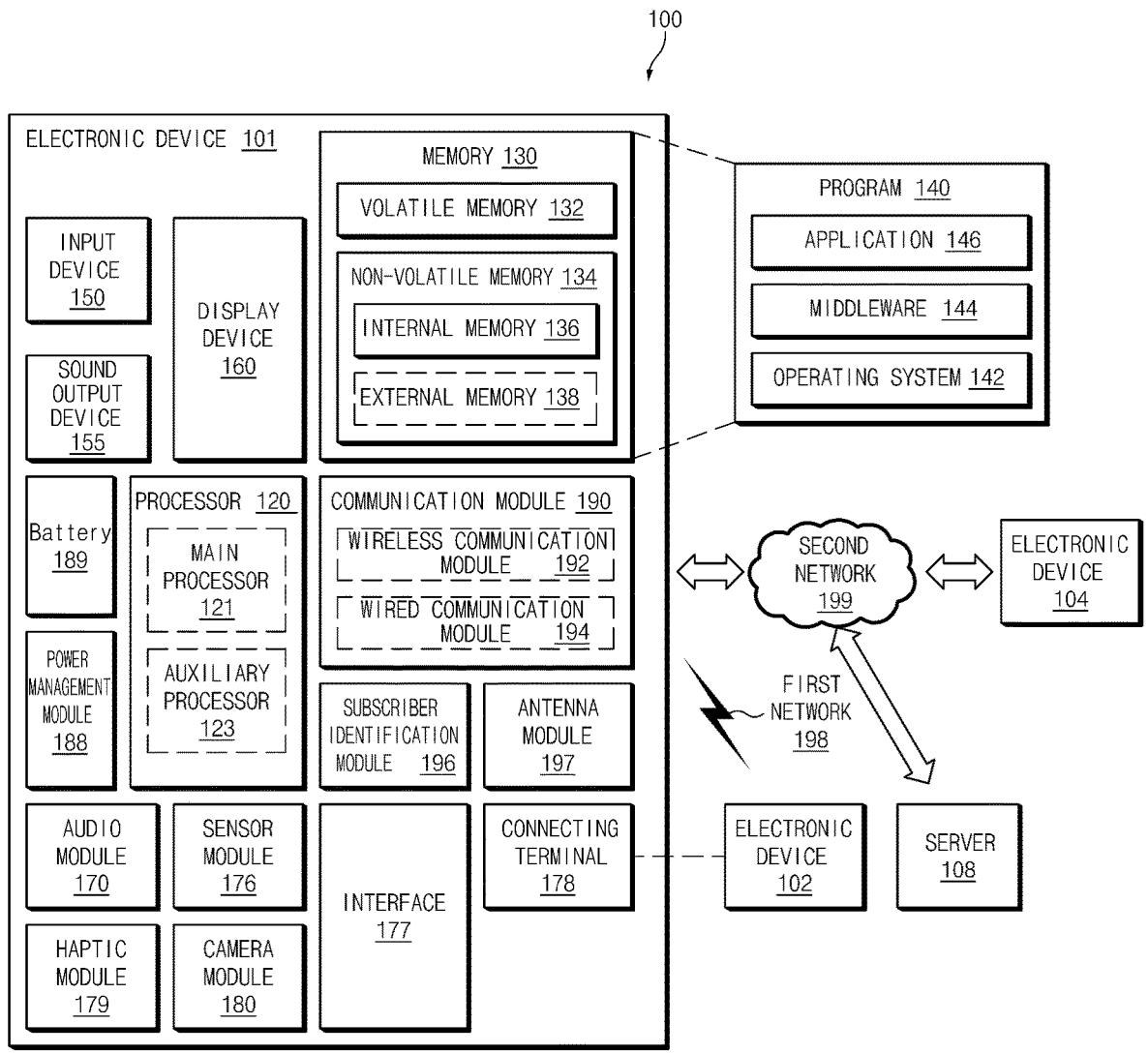
FIG. 1 is a block diagram of an electronic device in a network environment, according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
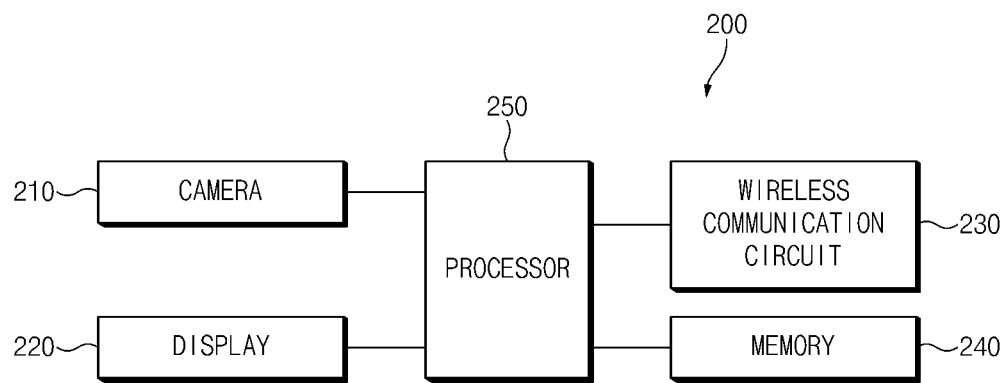
FIG. 2 is a block diagram of an electronic device, according to an embodiment.

FIG. 2 is a block diagram of an electronic device, according to an embodiment. According to certain embodiments, the electronic device may simultaneously (or contemporaneously) display web content results from capturing an image with a marker and the captured image.

According to an embodiment, an electronic device may include a camera 210, a display 220, a wireless communication circuit 230, a memory 240, and a processor 250. It is noted that the processor 250 may include one processor, or more than one processor. Accordingly, as used herein, processor 250 shall refer to both the singular and plural context.

The camera 210 (e.g., the camera module 180) may obtain an image. For example, the camera 210 may acquire a still image and a video.

The wireless communication circuit 230 (e.g., the wireless communication module 192) may support performance of wireless communication between the electronic device and an external electronic device or an external server, using a network. According to an embodiment, the processor 250 may control the wireless communication circuit 230 to transmit a marker (such as a QR Code, bar code, trademark, or logo) of a set type or an image of a specified type to an external server. The wireless communication circuit 230 may then receive a URL (uniform resource locator) associated with the marker from an external server. The wireless communication circuit 230 may receive content of a web page associated with the URL.

The display 220 allows for simultaneous/contemporaneous display of the image with the marker from the camera with web content associated with the marker. The display 220 (e.g., the display device 160) may visually provide a variety of information. For example, the display 220 may display an image acquired by the camera 210. The display 220 may also display content of a web page received through the wireless communication circuit 230. The controller may control the display 220 to overlap and display the image acquired by the camera 210 and at least a portion of the content of the web page.

The memory 240 (e.g., the memory 130) may store commands, information or data, associated with the operations of components included in the electronic device. For example, memory 240 may store instructions that, when executed, cause processor 250 to perform the various operations described herein.

The processor 250 (e.g., the processor 120) may be operatively connected to the camera 210, the display 220, the wireless communication circuit 230, and the memory 240, and may control overall operation of the electronic device. For example, the processor 250 may correspond to a processing circuit that controls other components electrically connected to the processor 250 and performs operation in the electronic device.

Hereinafter, it is assumed that the electronic device 200 of FIG. 2 performs the process of FIG. 3. Operations described as being performed by an electronic device may be implemented as instructions (i.e., commands) that may be performed (or executed) by the processor 250 of the electronic device. The instructions may be stored in, for example, a computer recording medium or the memory 240 of the electronic device shown in FIG. 2.

Figure 3:
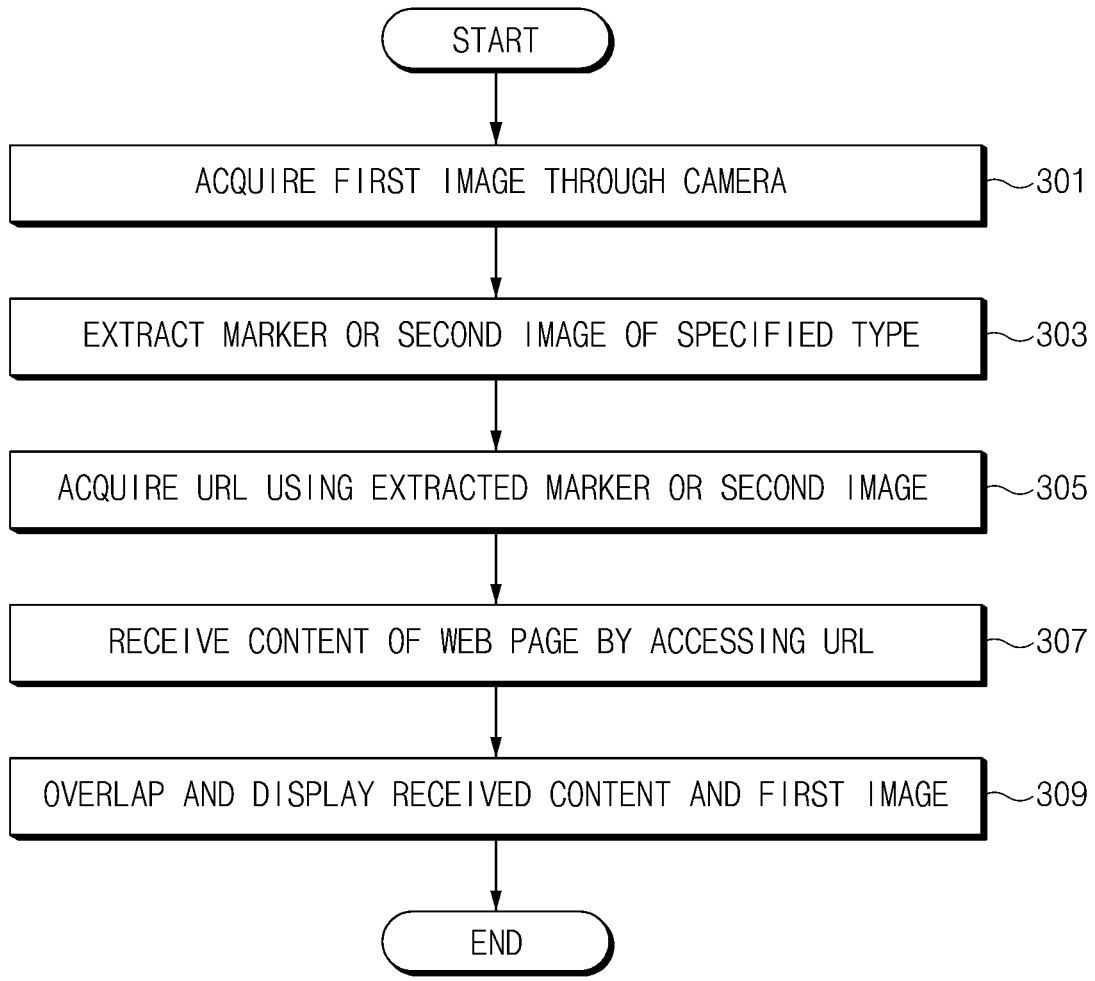
FIG. 3 is a flowchart illustrating a method of displaying content in an AR mode according to an embodiment.

FIG. 3 is a flowchart illustrating a method of displaying content in an AR mode according to an embodiment.

In operation 301, the processor 250 may acquire a first image through the camera 210.

According to an embodiment, the processor 250 may display the acquired first image on the display 220.

In operation 303, the processor 250 may extract a marker of a set type or a second image of a specified type, included in the first image.

The marker may mean a marker that is displayed to be recognized by the processor 250 in an image. For example, the marker of the set type may include a barcode or a quick response code. According to an embodiment, the second image of the specified type may be a trademark or a logo of a trademark stored in the memory 240.

A trademark or logo can be detected in an image in a variety of ways. For example, the image can be scanned for print on a surface of an object. If the print has text, the text can be searched for words that do not have a literal dictionary meaning, since trademarks cannot be descriptive of the article trademarked. Where the print includes graphical matter, the print can be scanned for graphical matter that is not photographic, where the graphical matter that is not photographic is deemed likely a logo. Non-photographic graphical matter can be detected by scanning for graphical matter that has uniform colors that abruptly change. Each text portion or graphical matter identified as likely to be a trademark or logo can then be ranked from most likely to least likely.

In operation 305, the processor 250 may acquire a universal resource locator (URL) using the extracted marker or the extracted second image.

According to an embodiment, the processor 250 may acquire a URL by reading out a barcode or a QR code. For example, the processor 250 may recognize a marker from an image photographed through the camera 210 or may acquire a URL from information acquired through a separate reader (not shown). According to an embodiment, the processor 250 may cause transmission of the extracted code or the second image to an external server through the wireless communication circuit 230 and receive a URL corresponding to the transmitted code or the transmitted second image from the external server. In certain embodiments, each text portion or graphical matter identifies as likely to be a trademark or logo can be transmitted, some of the text portions and graphical matter may correspond to a URL. The URL corresponding with the text or graphical matter ranked most likely during operation 303 can be used.

In operation 307, the processor 250 may receive content of a web page associated with the URL via the wireless communication circuit 230.

In operation 309, the processor 250 may overlap and display the received content and the first image on the display 220.

According to an embodiment, when a web page according to the URL supports an AR mode, the processor 250 may overlap and display the received content and the first image on the display 220. In addition, the AR mode may need to be supported by the processor 250. When the web page according to the URL does not support the AR mode, the processor 250 may execute a web browser and display content on the web browser. For example, the processor 250 may display the content without switching screens when the web page supports the AR mode, and switch a displayed screen to a web browser screen and display the content on the web browser when the web page does not support the AR mode.

According to an embodiment, the overlapping and displaying of the received content and the first image may include processing at least a portion of the web browser except for the content to be transparent, and overlapping and displaying a layer of the web browser and a layer of the first image. In this case, the web browser layer may be located in front of the layer of the first image.

According to an embodiment, the processor 250 may process an area having a specified color to be transparent. The processor 250 may determine a specified color of the web page from a character string with the specified color included in the URL. According to another embodiment, the processor 250 may receive data representing a specified color of the web page through the wireless communication circuit 230.

According to an embodiment, when the acquired URL includes a specified first character string, the processor 250 may determine that the web page supports the AR mode. According to an embodiment, when the processor 250 supports the AR mode and the acquired URL includes the first character string, the processor 250 may change the first character string of the acquired URL to a specified second character string, access the changed URL, and receive the content of the web page. For example, when the specified first character string 'samsung_arad_off' is included in the URL, the processor 250 may change 'samsung_arad_off' of the URL to 'samsung_arad_on', which is the specified second character string and access the changed URL.

According to an embodiment, when the acquired URL includes a parameter related to support of the AR mode, the processor 250 may determine that the web page supports the AR mode. For example, the URL may include a parameter called 'samsung_arad'. When the parameter of the URL is 'samsung_arad=false', the processor 250 may change the parameter to 'samsung_arad=true' and access the changed URL.

According to an embodiment, the processor 250 may receive data related to whether the web page supports the AR mode from the web page through the wireless communication circuit 230, and determine whether the web page supports the AR mode based on the received data. For example, the processor 250 may access the URL through the wireless communication circuit 230 and determine whether the AR mode is supported from the web page.

According to an embodiment, when the processor 250 overlaps and displays the content and the first image, the processor 250 may display the content at a position determined based on the position of the marker or the second image.

For example, the processor 250 may display the content at a position spaced apart from a position of the marker or the second image by a set distance in a set direction. As another example, the processor 250 may overlap and display the content and the marker or the second image. For example, the marker or the second image may be hidden by the content.

According to an embodiment, the processor 250 may determine the orientation of the content based on the orientation of the marker or the second image. According to an embodiment, the processor 250 may detect the orientation of the QR code based on three location symbols of the QR code.

In one embodiment, when the marker or the second image is rotated 90 degrees in the clockwise direction, the processor 250 may display the content by rotating the content 90 degrees in the clockwise direction.

According to an embodiment, the processor 250 may modify at least one of the size or shape of the content based on at least one of the size or shape of the marker or the second image, and display the modified content on the display 220.

In one embodiment, when the QR code is small in the first image acquired through the camera 210, the processor 250 may reduce the size of the content. As another example, when the shape of the QR code is tilted, the processor 250 may tilt the shape of the content.

Hereinafter, an embodiment in which the processor 250 displays content according to the method described above with reference to FIGS. 4 to 7 will be described.

Figure 4:
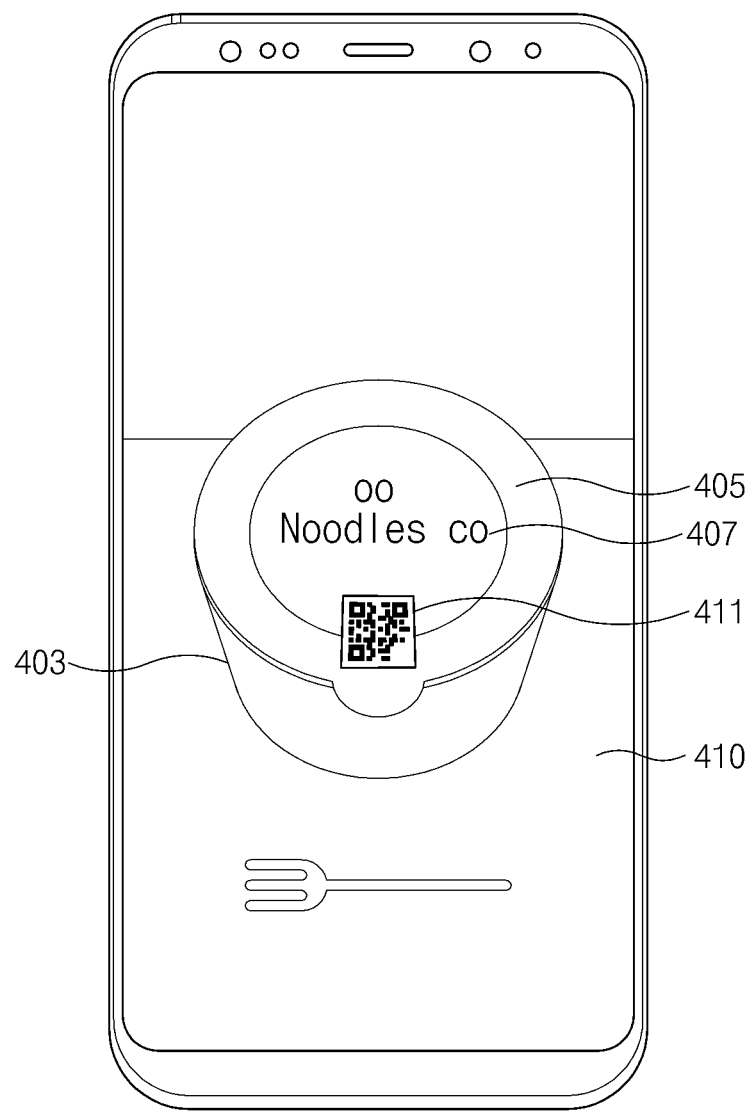
FIG. 4 is a diagram illustrating an electronic device that displays an acquired first image, according to an embodiment.

FIG. 4 is a diagram illustrating an electronic device that displays an acquired first image, according to an embodiment. By way of example, and not limitation, the first image in FIG. 4 is of a cup of noodles 403, covered by a foil seal 405. The foil seal 405 has printed thereon a trademark "NoodlesCo" 407 and a QR Code 411, and According to an embodiment, in operation 301, the processor 250 may display a first image 410 acquired through the camera 210 on the display 220 of the electronic device as shown in FIG. 4. The processor 250 may extract a QR code 411 included in the first image 410 (operation 303). The processor 250 may acquire a URL from the QR code 411 (operation 305), and access the acquired URL to receive content of a web page (operation 307). By way of example, and not limitation, the received content may be a timer, which will be used to demonstrate further embodiments in FIGS. 5A, 5B, 6A, 6B, and 7, with the understanding that other web page content can be used. In certain embodiments, the processor 250 may identify "NoodlesCo" as a trademark and acquire a URL for "NoodlesCo."

Figure 5A:
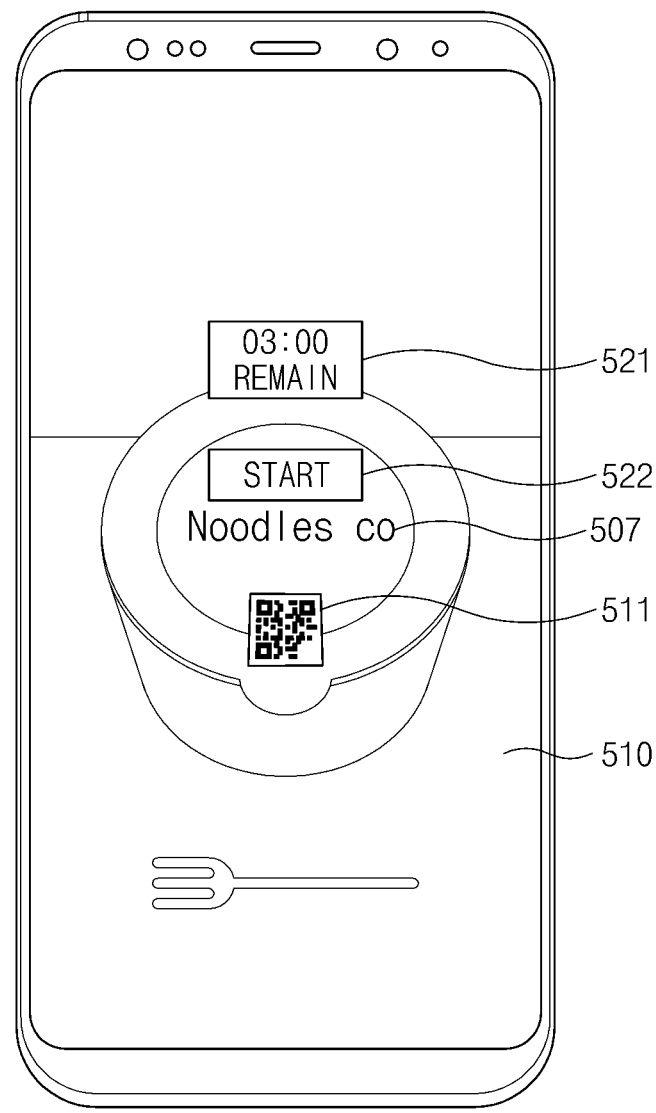
FIG. 5A is a diagram illustrating an electronic device that displays content in an AR mode according to an embodiment.
Figure 5B:
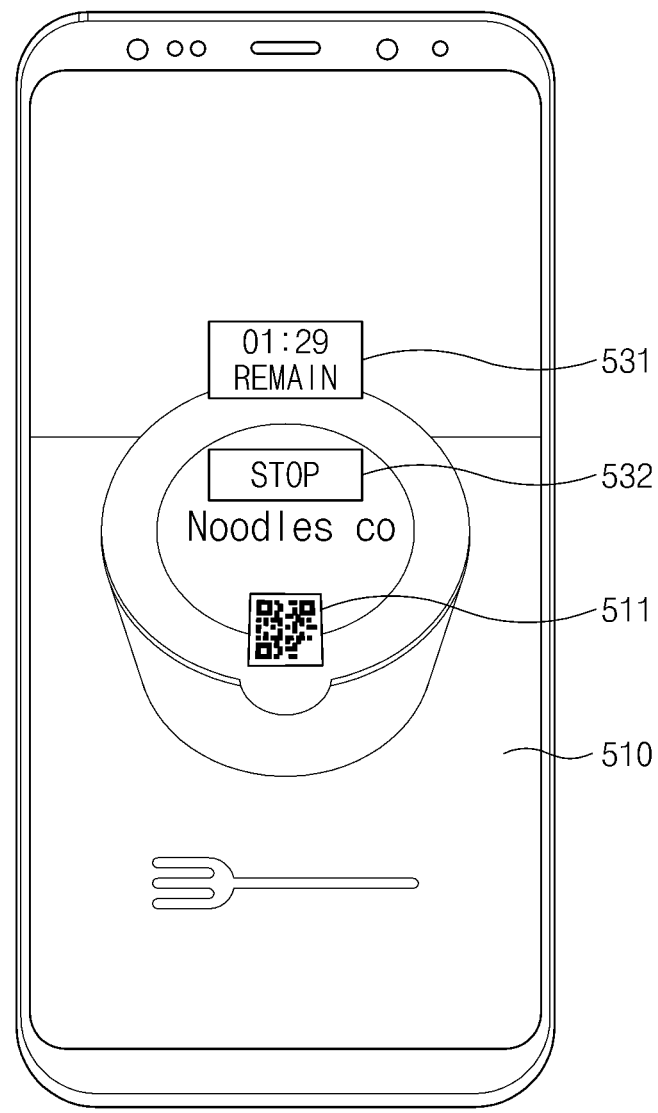
FIG. 5B is a diagram an operating state of a function of content displayed in an AR mode according to an embodiment.

FIG. 5A is a diagram illustrating an electronic device that displays content in an AR mode according to an embodiment; FIG. 5B is a diagram an operating state of a function of content displayed in an AR mode according to an embodiment;

According to an embodiment, as shown in FIG. 5A, the processor 250 may overlap and display pieces of content 521 and 522 and the first image 510 (operation 309). The location where the content is displayed may be determined based on the location of the trademark 507 and QR code 511. For example, content 521 and 522 may be displayed at a location which overlaps the surface (the foil seal) of the QR Code 511, or trademark 507.

According to an embodiment, the display 220 of the electronic device is a touch screen display, and the processor 250 may receive a touch input for selecting the "START" object 522 among the displayed content. The processor 250 may operate a timer function in response to reception of the touch input. When the timer function operates, the remaining time object 521 may be changed to a remaining time object 531 shown in FIG. 5B. As another example, the "START" object 522 may be changed to a "STOP" object 532 as shown in FIG. 5B while the timer is running.

Figure 6A:
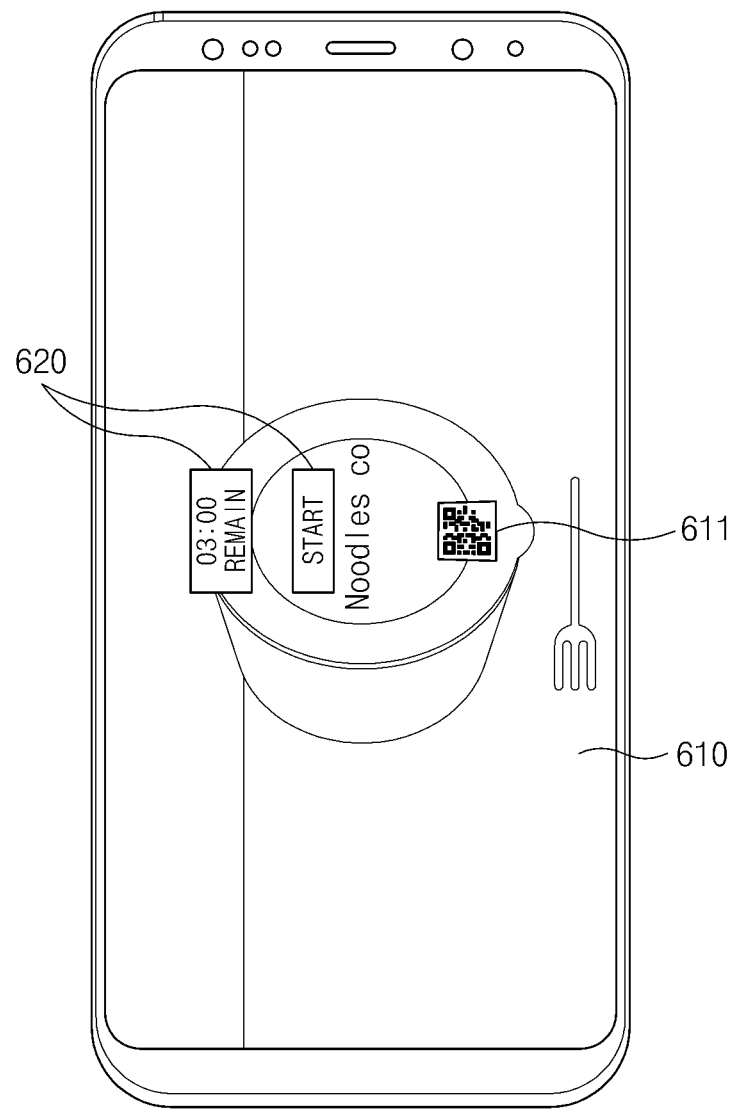
FIG. 6A is a diagram illustrating an electronic device that rotates content to the left in the direction of a code and displays the content, according to an embodiment.
Figure 6B:
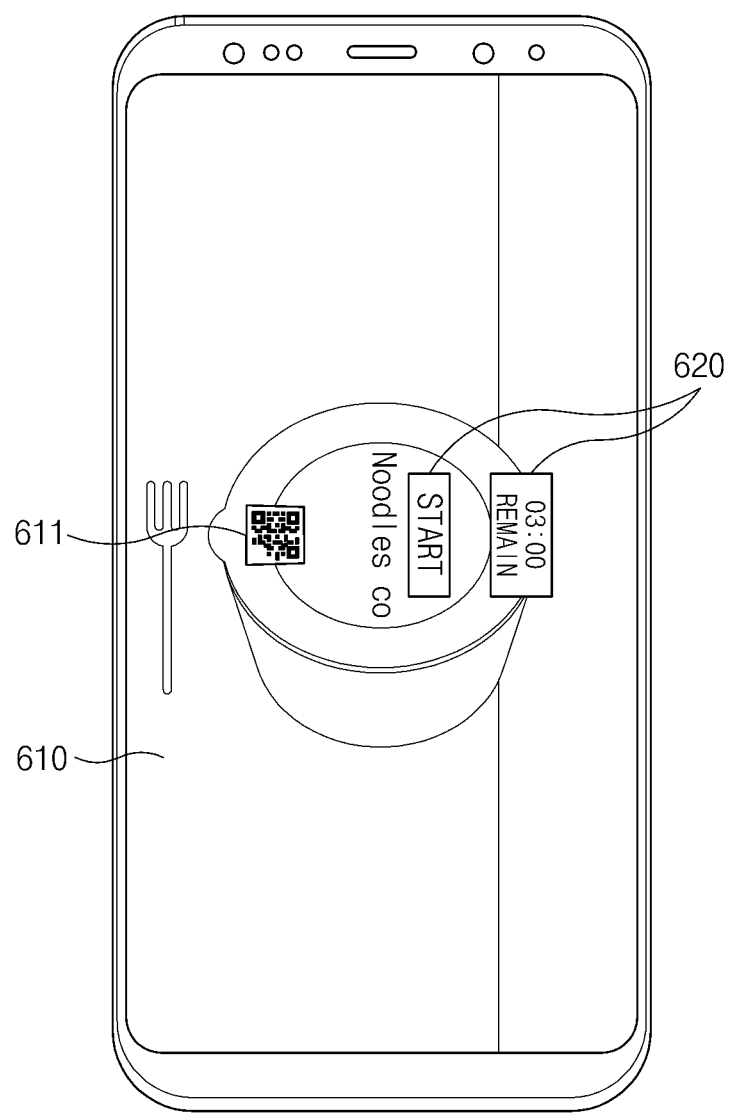
FIG. 6B is a diagram illustrating an electronic device that rotates content to the right in the direction of a code and displays the content, according to an embodiment.

FIG. 6A is a diagram illustrating an electronic device that rotates content to the left in the direction of a code and displays the content, according to an embodiment; FIG. 6B is a diagram illustrating an electronic device that rotates content to the right in the direction of a code and displays the content, according to an embodiment;

According to one embodiment, when a QR code 611 of a first image 610 is rotated 90 degrees in a counterclockwise direction as shown in FIG. 6A, the processor 250 may rotate and display a content 620 90 degrees in the counterclockwise direction.

According to one embodiment, as shown in FIG. 6B, when the QR code 611 of the first image 610 is rotated 90 degrees in the clockwise direction, the processor 250 may rotate and display the content 620 90 degrees in the clockwise direction.

Figure 7:
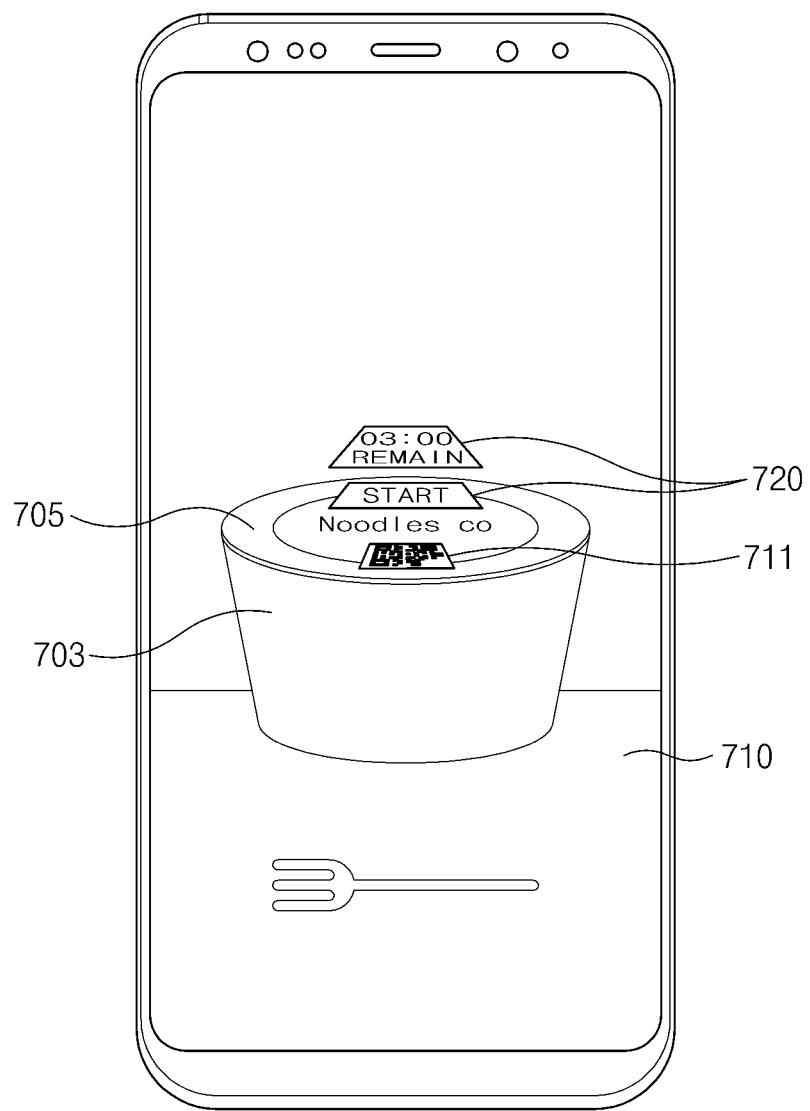
FIG. 7 is a diagram illustrating an electronic device that displays content modified based on a shape of a code, according to an embodiment; and In the description of the drawings, the same or similar reference numerals may be used for the same or similar components.

FIG. 7 is a diagram illustrating an electronic device that displays content modified based on a shape of a code, according to an embodiment.

According to one embodiment, when a QR code 711 of a first image 710 acquired as shown in FIG. 7 is modified by the perspective of the photograph, the processor 250 may modify the content of the web page based on the modified shape of the QR code 711. For example, the QR code 711 has been modified in a trapezoidal shape in FIG. 7, and the processor 250 may modify the content 720 in a trapezoidal shape, and display the modified content 720. The QR code 711 is disposed on a surface, foil seal 705 of the cup of noodles 703. Based on a comparison of the trapezoidal shape (for example, the angles of the non-parallel lines), the angle of the surface/foil seal 705 to a line from the surface/foil seal to the camera can be determined. With the foregoing angle, the processor can perform perspective transformation of the elements 720 to make the elements appears as though they are on the surface of the object, e.g., the foil seal 705 on the cup of noodles.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 200 of FIG. 2) according to an embodiment may include a camera (e.g., the camera 210 of FIG. 2), a display (e.g., the display 220 of FIG. 2), a wireless communication circuit (e.g., 230 of FIG. 2), a processor (e.g., 250 of FIG. 2) operatively connected to the display (e.g., 220 of FIG. 2), the camera (e.g., 210 of FIG. 2), and the wireless communication circuit (e.g., 230 of FIG. 2) and a memory (e.g., 240 of FIG. 2) operatively connected to the processor (e.g., 240 of FIG. 2). The processor (e.g., 250 of FIG. 2) may execute instructions stored in the memory (e.g., 240 of FIG. 2) to cause the electronic device (e.g., 200 of FIG. 2) to perform an operation according to an embodiment. For example, the processor (e.g., 250 of FIG. 2) may acquire a first image through the camera (e.g., 210 of FIG. 2), and extract a marker or a second image of a specified type, included in the first image. Furthermore, the processor (e.g., 250 of FIG. 2) may acquire a universal resource locator (URL) by using the extracted marker or the extracted second image, and receive content of a web page associated with the URL through the wireless communication circuit (e.g., 230 of FIG. 2). The processor (e.g., 250 of FIG. 2) may allow the display (e.g., 220 of FIG. 2) to display the first image and at least a portion of the received content at a location on the first image determined based on the position of the marker or the second image.

Alternatively, according to one embodiment, the instructions may cause the processor (e.g., 250 of FIG. 2) to transmit the extracted marker or the second image to an external server through the wireless communication circuit (e.g., 230 of FIG. 2) and receive the URL from the external server through the wireless communication circuit (e.g., 230 of FIG. 2).

Alternatively, according to one embodiment, the instructions may cause the processor (e.g., 250 of FIG. 2) to display the first image and at least a portion of the received content on the first image on the display (e.g., 220 of FIG. 2) when the web page supports an AR mode and execute a web browser and display the content on the web browser when the web page does not support the web browser.

Alternatively, according to one embodiment, the instructions may cause, when executed, the processor (e.g., 250 of FIG. 2) to determine that the web page supports the AR mode when the URL includes a specified first character string.

Alternatively, according to one embodiment, the instructions may cause, when executed, the processor (e.g., 250 of FIG. 2) to change a first character string into a specified second character string and receive content of the web page using an URL in which the first character string is changed to the second character string through the wireless communication circuit (e.g., 230 of FIG. 2).

Alternatively, according to one embodiment, the instructions may cause, when executed, the processor (e.g., 250 of FIG. 2) to determine that the web page supports the AR mode when the URL includes a parameter related to support of the AR mode.

According to one embodiment, the instructions may cause, when executed, the processor (e.g., 250 of FIG. 2) to receive data related to whether the web page supports the AR mode from the web page through the wireless communication circuit (e.g., 230 of FIG. 2), and determine whether the web page supports the AR mode based on the received data.

Alternatively, according to one embodiment, the instructions may cause, when executed, the processor (e.g., 250 of FIG. 2) to display the content in a direction set based on a position of the marker or the second image.

Alternatively, according to one embodiment, the instructions may cause, when executed, the processor (e.g., 250 of FIG. 2) to overlap and display the content and the marker or the second image.

Alternatively, according to one embodiment, the instructions may cause, when executed, the processor (e.g., 250 of FIG. 2) to determine an orientation in which the content is displayed based on an orientation in which the marker or the second image is displayed within the first image.

Alternatively, according to one embodiment, the instructions may cause, when executed, the processor (e.g., 250 of FIG. 2) to display the content whose at least one of a size or a shape is modified based on a size or a shape of the marker or the second image.

According to a method of displaying content of a web page according to one embodiment, an electronic device (e.g., 200 of FIG. 2) may perform an operation (e.g., 301 of FIG. 3) of acquiring a first image through a camera (e.g., 210 of FIG. 2). The electronic device (e.g., 200 of FIG. 2) may perform an operation of extracting a marker or a second image of a specified type included in the acquired first image (e.g., 303 of FIG. 3). Thereafter, the electronic device (e.g., 200 of FIG. 2) may perform an operation of acquiring an universal resource locator (URL) by using the extracted marker or the extracted second image (e.g., 304 of FIG. 3). The electronic device (e.g., 200 of FIG. 2) may perform an operation of receiving content of a web page associated with the URL (e.g., 307 of FIG. 3) and displaying the first image and at least a portion of the received content at a position on the first image determined based on a position of the marker and the second image.

Alternatively, according to one embodiment, the electronic device (e.g., 200 of FIG. 2) may perform an operation of transmitting the extracted marker or the extracted second image when the URL is acquired to an external server and receiving the URL from the external server.

Alternatively, according to one embodiment, the electronic device (e.g., 200 of FIG. 2) may execute a web browser and display the content on the web browser when the web page does not support the AR mode.

Alternatively, according to one embodiment, the electronic device (e.g., 200 of FIG. 2) may determine an orientation in which the content is displayed based on an orientation of the marker or the second image.

Furthermore, according to one embodiment, the electronic device (e.g., 200 of FIG. 2) may modify at least one of a size or a shape of the content based on at least one of a size or a shape of the marker or the second image. The electronic device (e.g., 200 of FIG. 2) may display the modified content on the display.

One embodiment may be implemented in a form of a storage medium that stores computer readable instructions. The instructions may cause, when executed by the electronic device (e.g., 200 of FIG. 2), the electronic device (e.g., 200 of FIG. 2) to perform an operation according to embodiments. When the instructions are executed, the electronic device (e.g., 200 of FIG. 2) may acquire a first image through a camera (e.g., 210 of FIG. 2), and extract a marker or a second image of a specified type included in the first image. Furthermore, the electronic device (e.g., 200 of FIG. 2) may acquire a universal resource locator using the extracted marker or the second image. The electronic device (e.g., 200 of FIG. 2) may receive content of a web page associated with the URL and display the first image and at least a portion of the received content at a position on the first image determined based on a position of the marker and the second image.

Alternatively, according to one embodiment, the storage medium may store instructions that cause the electronic device (e.g., 200 of FIG. 2) to perform a web browser and display the content on the web browser when the web page does not support the AR mode.

Alternatively, according to one embodiment, the storage medium may store instructions that cause the electronic device (e.g., 200 of FIG. 2) to determine an orientation in which the content is displayed based on an orientation of the marker or the second image.

Furthermore, according to one embodiment, the storage medium may store instructions that cause the electronic device (e.g., 200 of FIG. 2) to modify at least one of a size or a shape of the content based on at least one of a size or a shape of the marker or the second image and display the modified content on the display (e.g., 220 of FIG. 2).

According to embodiments disclosed herein, it is possible to display the web content associated with the object photographed on the camera preview screen in the augmented reality mode, thus allowing the user to intuitively recognize the information. In addition, various effects may be provided that are directly or indirectly understood through the disclosure.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
a display;
a wireless communication circuit;
at least one processor operatively connected to the display, the camera and the wireless communication circuit; and
a memory operatively connected to the at least one processor and storing instructions that, when executed, cause the at least one processor to:
obtain a first image through the camera;
extract a marker included in the first image;

obtain a Uniform Resource Locator (URL) using the extracted marker; receive content of a web page associated with the URL through the wireless communication circuit;

display, when the web page supports an Augmented Reality (AR) mode, the web page including the content using a web browser by processing an area of a specified color in the web page to be transparent such that the first image is viewable through the area in the web page, the specified color being indicated by a string included in the URL; and display, when the web page does not support the AR mode, the web page including the content using the web browser.

2. The electronic device of claim 1, wherein the instructions, when executed, cause the at least one processor to:
transmit the extracted marker to an external server through the wireless communication circuit, and
receive the URL from the external server through the wireless communication circuit.

3. The electronic device of claim 1, wherein the instructions, when executed, cause the at least one processor to determine that the web page supports the Augmented Reality (AR) mode when the URL includes a specified character string.

4. The electronic device of claim 1, wherein the instructions, when executed, cause the at least one processor to:
change a first character string of the URL to a specified second character string, when the first character string indicates that the web page does not support the Augmented Reality (AR) mode, and
receive the content of the web page using a URL in which the first character string is changed to the second character string through the wireless communication circuit.

5. The electronic device of claim 1, wherein the instructions, when executed, cause the at least one processor to determine that the web page supports the Augmented Reality (AR) mode when the URL includes a parameter related to support of the AR mode.

6. The electronic device of claim 1, wherein the instructions, when executed, cause the at least one processor to:
receive data related to whether the web page supports the Augmented Reality (AR) mode based on the web page through wireless communication circuit, and
determine whether the web page supports the AR mode based on the received data.

7. The electronic device of claim 1, wherein the content is displayed to be positioned in a direction set based on a position of the marker.

8. The electronic device of claim 1, wherein an orientation in which the content is displayed is determined based on an orientation in which the marker is displayed within the first image.

9. The electronic device of claim 1, wherein the instructions, when executed, cause the at least one processor to:

modify a size or a shape of the content based on at least one of a size or a shape of the marker,
display the modified content on the display.

10. A method of displaying content of a web page, comprising:
obtaining a first image through a camera;
extracting a marker and a second image of a specified type included in the first image;
obtaining an Uniform Resource Locator (URL) using the extracted marker or an extracted second image;
receiving content of the web page associated with the URL by a communication circuit; and
displaying, when the web page supports an Augmented Reality (AR) mode, the web page including the content using a web browser by processing an area of a specified color in the web page to be transparent such that the first image is viewable through the area in the web page, the specified color being indicated by a string included in the URL; and
displaying, when the web page does not support the AR mode, the web page including the content using the web browser.

11. The method of claim 10, wherein the obtaining of the URL includes transmitting the extracted marker or the extracted second image to an external server; and receiving the URL from the external server.

12. The method of claim 10, wherein an orientation in which the content is displayed is determined based on an orientation of the marker or the second image.

13. A non-transitory storage medium storing computer readable instructions,
wherein the computer readable instructions, when executed by an electronic device, cause the electronic device to:
obtain a first image through a camera;
extract a marker and a second image of a specified type included in the first image;
obtain an Uniform Resource Locator (URL) using the extracted marker or an extracted second image;
receive content of a web page associated with the URL;
display, when the web page supports an Augmented Reality (AR) mode, the web page including the content using a web browser by processing an area of a specified color in the web page to be transparent such that the first image is viewable through the area in the web page, the specified color being indicated by a string included in the URL; and
display, when the web page does not support the AR mode, the web page including the content using the web browser.

14. The non-transitory storage medium of claim 13, wherein the computer readable instructions, when executed by the electronic device, cause the electronic device to determine an orientation in which the content is displayed based on an orientation of the marker or the second image.

* * * * *